(No Model.)
D. R. DEAN.
GRAIN DRILL.
No. 246,296. Patented Aug. 30, 1881.
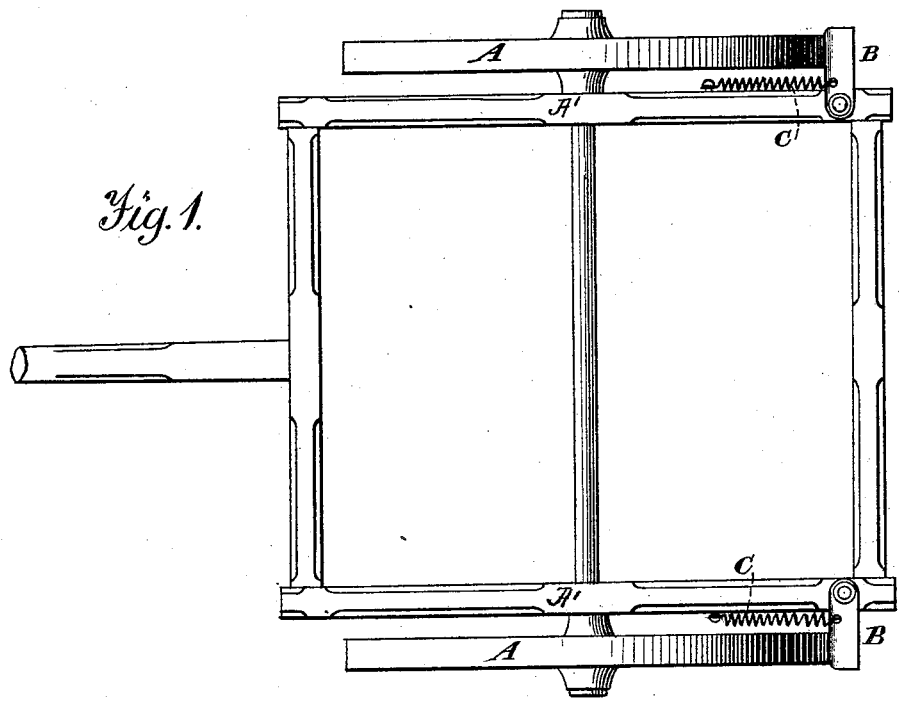
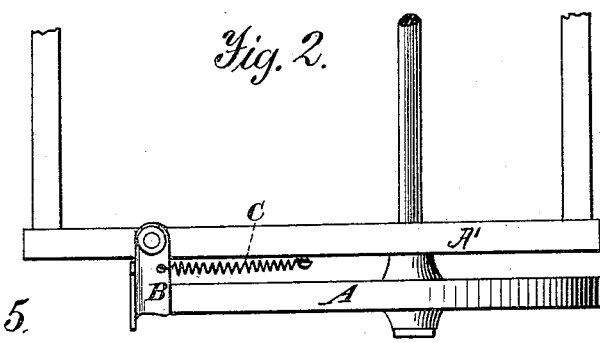
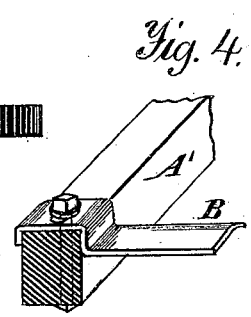
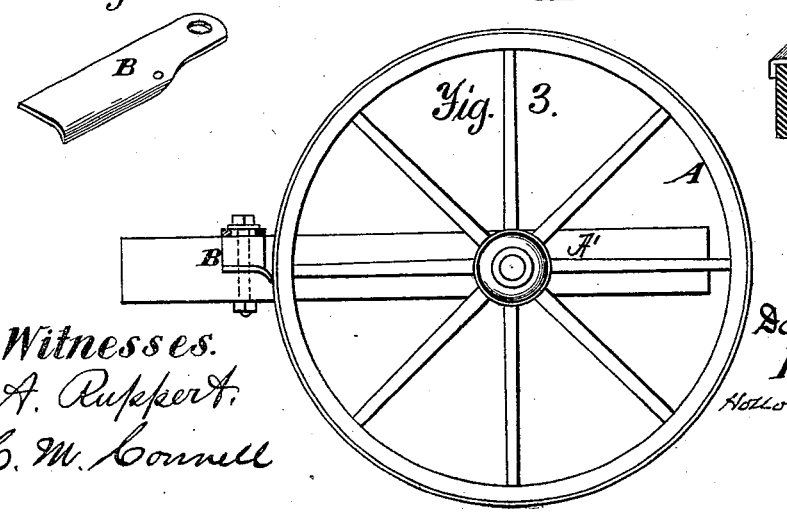
Witnesses.
A. Ruppert
C. M. Connell
David R. Dean
Inventor
Holloway & Blanchard
Attys.

UNITED STATES PATENT OFFICE.

DAVID R. DEAN, OF NORTH ROBINSON, OHIO.

GRAIN-DRILL.

SPECIFICATION forming part of Letters Patent No. 246,296, dated August 30, 1881.

Application filed June 4, 1881. (No model.)

*To all whom it may concern:*

Be it known that I, DAVID R. DEAN, a citizen of the United States residing at North Robinson, in the county of Crawford and State of Ohio, have invented certain new and useful Improvements in Grain-Drills; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in grain-drills and other analogous machines for planting seed or distributing fertilizers, where the amount of seed or fertilizer discharged from the machine is regulated by the periphery of one or both of the carrying-wheels; and it consists in providing an adjustable and yielding scraper to at all times bear upon the tread of the wheel or wheels, which will keep the wheels clear of any accumulation of dirt or mud that might otherwise act to change the feed, as will be fully described hereinafter.

In the drawings, Figure 1 represents a top or plan view of my improvement and a portion of the frame as attached. Fig. 2 represents a portion of Fig. 1 only in plan. Fig. 3 represents a portion of Figs. 1 and 2 in side view, and Figs. 4 and 5 represent details of parts.

A represents the carrying-wheels of a grain-drill; A', the frame, attached to the axles of wheels A in any secure manner.

B is the yielding scraper, pivoted at one end by a bolt to frame A', so that the opposite or free end may yield.

C is a spiral spring, one end of which is attached to scraper B, and the other end to a pin that is fast in frame A'. The edge of that part of scraper B which bears upon the tread of the wheel is curved downward, so as to surely clean or scrape off all adhering substance that might otherwise affect or derange the feed. This scraper can be attached to any portion of the frame most convenient without departing from my invention.

In all machines in which the feed is regulated by the periphery or tread of the carrying-wheels any accumulation of matter thereon will seriously affect the feed; but by the introduction and use of my scraper all accumulation is kept from the tread of the wheels, and thereby the feed is not in any way interfered with, as the wheels act upon the feed device at all times alike, and hence the same amount of seed or other material is distributed at each revolution of the wheels, whether the ground be wet or dry.

The amount of pressure or force exerted upon the scraper to bear upon the wheels may be regulated by the pin that holds the outer end of the spring, by having adjusting-holes for the pin in the frame farther from or nearer to the scraper, as may be desired.

I am aware that it is not new, broadly, to attach scrapers to the wheels of agricultural implements to remove the earth from their peripheries, such means being shown in the following patents, viz: No. 167,287, No. 204,093, No. 204,488, No. 208,885, No. 218,833, and No. 218,890, which scrapers I do not claim, as they all differ from mine in their construction and mode of operation; but,

Having thus described my invention, what I claim, and desire to secure by Letters Patent, is—

In combination with the carrying-wheels and frame of a grain-drill in which the amount of grain distributed is regulated by the peripheries of the wheels, an automatically and constantly acting scraper B and spring C, they being arranged substantially in the manner and for the purpose set forth.

In testimony whereof I affix my signature in presence of two witnesses.

DAVID R. DEAN.

Witnesses:
D. P. HOLLOWAY,
C. M. CONNELL.